July 12, 1966  W. C. BRENNER  3,260,868
MAGNETIC FLUX PRODUCING ARRANGEMENT
Filed Oct. 31, 1963  2 Sheets-Sheet 1

WITNESSES
Theodore F. Wzylul
Edward F. Possessky

INVENTOR
William C. Brenner
BY [signature]
ATTORNEY

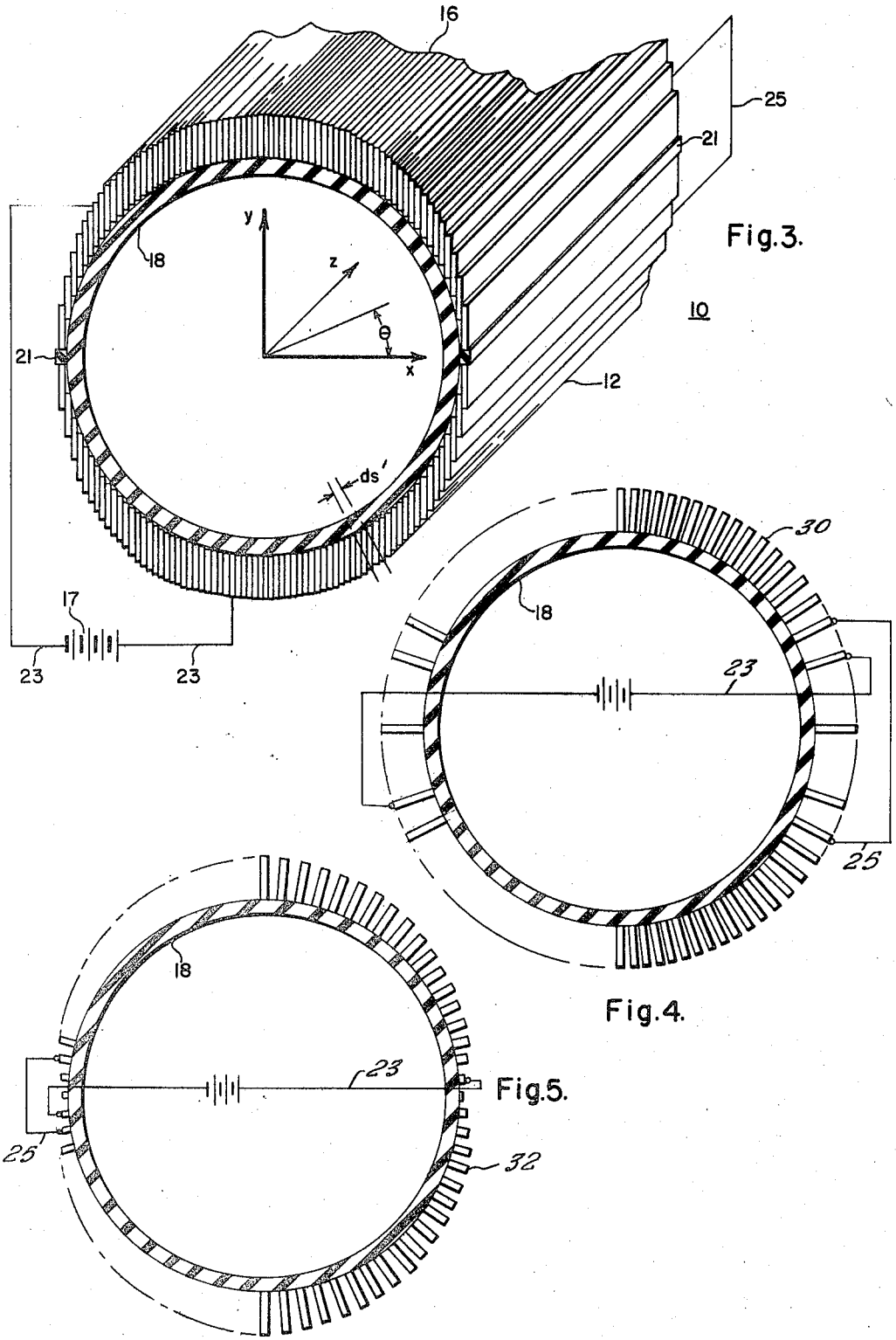

United States Patent Office 3,260,868
Patented July 12, 1966

3,260,868
MAGNETIC FLUX PRODUCING ARRANGEMENT
William C. Brenner, Fox Chapel, Pittsburgh, Pa., assignor to Westinghouse Electric Corporation, Pittsburgh, Pa., a corporation of Pennsylvania
Filed Oct. 31, 1963, Ser. No. 320,409
6 Claims. (Cl. 310—11)

The present invention relates to magnetic flux producing arrangements and more particularly to such arrangements which are effective to produce sinusoidally or uniformly distributed magnetic flux.

The Faraday theory of electromagnetic induction is commonly applied in various dynamic electromagnetic structures for the generation of electric energy or for the utilization of such energy in producing motor action. In dynamic electromagnetic machines provided in electromechanical form, the Faraday theory accounts for voltage generation in copper or other solid conductors with which flux linkages continually undergo change by movement of the conductors through a magnetic flux field or by movement of a magnetic flux field across the conductors. Thus, induction and synchronous generators and motors all operate on this basis.

In dynamic electromagnetic apparatus provided in the form of a magnetohydrodynamic (or MHD) generating system, the Faraday theory is more specifically expressed as MHD theory according to which an electric voltage is generated between electrodes on spaced walls of a duct along which a conductive fluid or ionized gas is transported and in which a magnetic field is established transversely of both the interelectrode direction and the flow direction of the fluid. In a MHD system, a flowing conductive fluid or ionized gas is given the role of a conductor or conducting medium undergoing motion through a magnetic flux field, and an electric field and a corresponding voltage are produced across the moving fluid in a direction determined by well known directional rules of electromagnetic induction. Such induced voltage appears across duct electrodes between which the fluid is channeled, and when a load circuit is connected across the electrodes, current is generated and circulated through the completed circuit.

In any of the foregoing or similar applications of electromagnetic induction theory, magnetic flux distribution is an important consideration for it is determinative of the character of voltage induction in the conductors or conducting medium of the dynamic electromagnetic apparatus. In electromechanical machines, for example, the voltage induced in rotor or stator bars or windings depends upon the distribution of magnetic flux about the rotor-stator air gap. Similarly, in a MHD generating system, voltage induction depends upon the distribution of transverse magnetic flux along the generating duct length and over the generating duct cross-section.

More specifically, it is often desirable in electromechanical machines to distribute magnetic flux sinusoidally about the rotor or stator periphery while in MHD generating ducts it is desirable, if not essential, to distribute magnetic flux uniformly throughout the generating duct for voltage generating uniformity along the duct. The structure encompassed by the present invention can be employed to obtain both of these flux distribution patterns and thus has utility in electromechanical machines and MHD systems as well as other apparatus such as testing equipment.

Thus, in accordance with the principles of the present invention, a magnetic flux producing arrangement for dynamic electromagnetic or other apparatus comprises elongated generally cylindrical and axially extending winding means suitably disposed on a nonmagnetic core member if desired and suitably energized so that the axially directed current through individual circumferential segments thereof varies substantially as the sine of the angle made by the radial direction of the respective segments with the resulting diametrical magnetic pole axis. Flux within the cylindrical current sheet is thus substantially uniformly distributed in parallel relation to the pole axis and flux outside the cylindrical current sheet is arcuately distributed thereabout. Flux both within and without the current sheet is substantially sinusoidally distributed with respect to circumferential position.

It is therefore an object of the invention to provide a novel magnetic flux producing arrangement having elongated cylindrical winding means in which magnetizing current is distributed peripherally in such a manner as substantially to produce a uniform magnetic field in the space which it encompasess.

Another object of the invention is to provide a novel magnetic flux producing arrangement having elongated cylindrical winding means in which magnetizing current is peripherally distributed in such a manner as substantially to produce a sinusoidal distribution of magnetic flux with respect to circumferential position within and without the winding means.

These and other objects of the invention will become more apparent upon consideration of the following detailed description along with the attached drawings, in which:

FIGS. 3 to 5 show respective structural embodiments of the invention.

Figure 1:
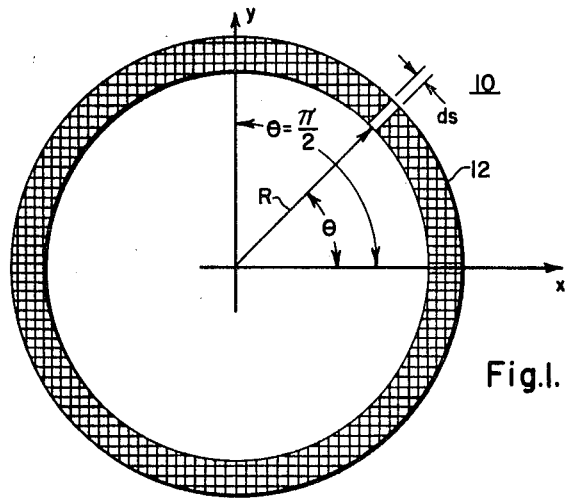
FIGURE 1 is a schematic representation of a magnetic flux producing arrangement constructed in accordance with the principles of the invention.

With reference now to FIG. 1, there is schematically shown a magnetic flux producing arrangement 10 comprising elongated generally cylindrical winding means 12. Individual winding elements (not shown in FIG. 1) extend longitudinally or axially of the winding means 12 so as to produce magnetic flux parallel to the reference $x$ direction in the plane of the drawing sheet when suitably energized with magnetizing current.

In order to produce substantially uniform flux within the winding means 12, the current through any elongated circumferential winding segment $ds$ is determined by the angular location of the segment $ds$ relative to the reference $x$ or pole axis. More particularly, the current in any segment $ds$ is theoretically given by:

$$I_{ds} = 2rH_0 \sin \theta d\theta$$

where: $\theta$ = circumferential position of $ds$.

The uniform magnetic field within the winding means 12 is thus theoretically given by (assuming the total flux circuitry is formed through air and that half of the ampere turns are thus applied to the reluctance of an air magnetic path externally of the winding means 12):

$$B_I = \mu H_0 = 4\pi H_0 \times 10^{-7}$$

It is noted however that magnet iron can be disposed outside of the winding means 12 and in that event more magnetomotive force is available for uniform flux production within the winding means 12.

Figure 2:
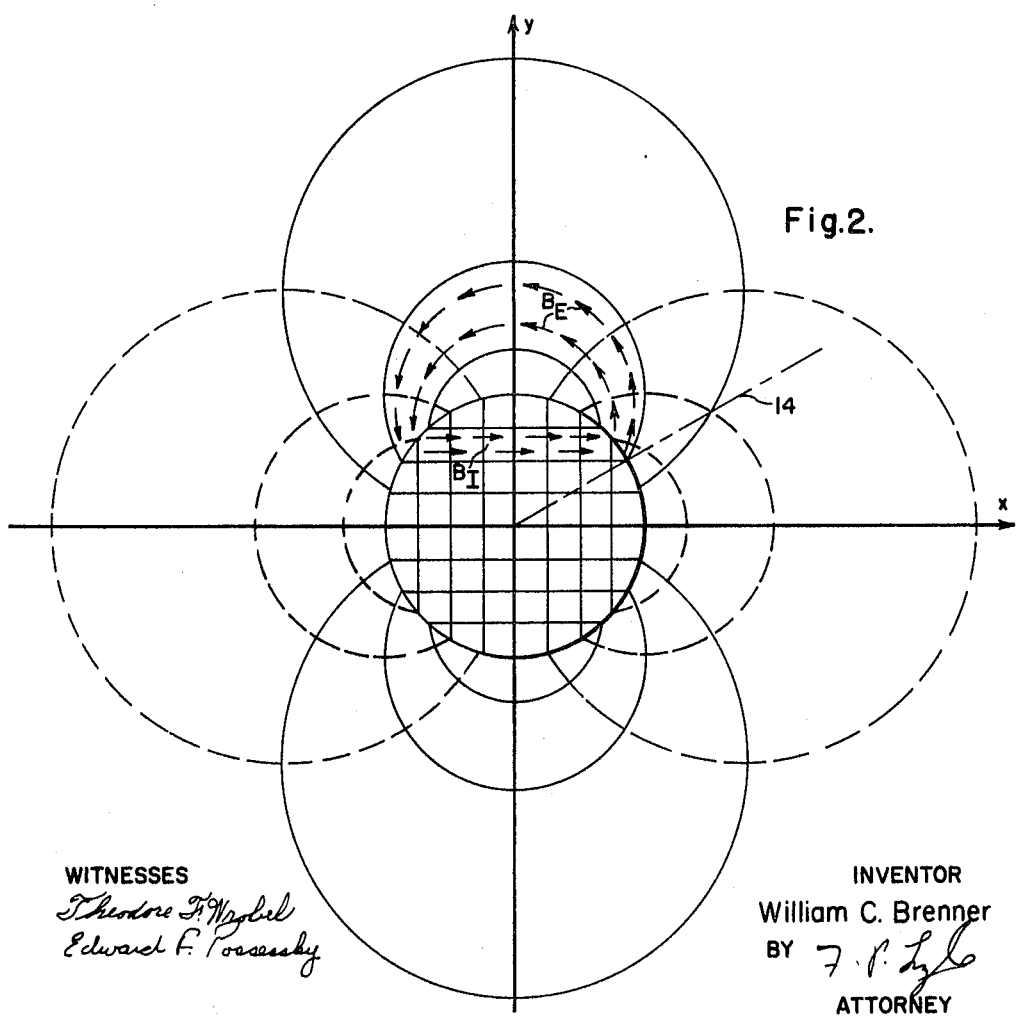
FIG. 2 is similar to FIG. 1 but shows in addition a magnetic field map associated with the flux producing arrangement.

The form of the overall magnetic field (as well as equipotential lines thereof shown dotted) is mapped in FIG. 2. Such form is derived by resolution of flux produced by each circumferential segment of the winding means 12 into $x$ and $y$ components with cancellation of the $y$ flux component occurring in the resulting internal field. Thus, the internal field $B_I$ is directed transaxially along reference planes parallel to the $x$-axis whereas the external field $B_E$ is directed circularly or arcuately about center points disposed along the y-axis. The internal and external fields $B_I$ and $B_E$ meet angularly along the periphery of the winding means 12 as though radial mirrors (such as that as indicated by the reference character 14) were present. This analogy to optics, however, only serves as a clarifying comparison and obviously is not valid for analytical purposes.

Net mechanical reaction forces on the current carrying winding elements of the winding means 12 are substantially tangential since radially directed components of force tend to cancel each other. The intensity of such tangential force on a unit of surface area is given by:

$$F = \mu(H_0)^2 \sin 2\theta = B_0^2/\mu \times \sin 2\theta$$

newtons per square meter

These tangential or hoop-like forces produce bending moments on the winding means 12 so as to urge it against its inherent rigidity into an elliptically tubular shape. It is thus important in commercial or other uses that the winding means 12 be sufficiently rigid to withstand such deformation.

An illustrative structural embodiment of the magnetic flux producing arrangement 10 is shown in FIG. 3. In this case substantially sinusoidal distribution or sheet of magnetizing current circumferentially about the winding means 12 is obtained by providing substantially uniform current density throughout the winding means 12 while the cross sectional conductive area of the winding means 12 in any elongated radial segment varies as a sinusoidal function of the circumferential position of the winding segment. Thus, for example at $\theta = \pi/2$, the winding means cross section is maximum while at $\theta = 0$ it is minimum or zero.

It is further noted that a plurality of elongated and substantially uniform ribbon-like conductors 16 (or alternatively solid "crescent shaped" pieces of material) are distributed about the periphery of and extended longitudinally of a cylindrical core 18 which can be formed from a nonmagnetic and electrically insulative structural material and further can be used simply as a winding form or can be used for strengthening purposes as supporting means in the completed flux producing arrangement 10. Alternatively, for example, outer ring members (not shown) can be used for support. The respective flat planes of the conductors 16 are parallel to each other and to the y–z reference plane. To obtain such ribbon distribution, the individual ribbons can be stacked with flat sides against each other and the stack can then be suitably flexibly secured and subsequently worked so that the flat ribbon sides slide relative to each other to produce a semi-cylindrical or cylindrical shape. The ribbon conductors 16 further can be connected in parallel from $\theta = 0$ to $\theta = \pi$, which combination is then connected in series with a parallel combination of conductors 16 from $\theta = \pi$ to $\theta = 2\pi$ and insulatively spaced (as indicated by reference character 21) so that oppositely flowing currents in the upper and lower halves of the winding means 12 produce aiding flux.

Accordingly, magnetizing current, which is derived from a suitable source 17 through conductors 23 and 25, is substantially equally valued in each conductor 16. However, because the cross section of current conducting material provided for any radial winding segment $ds'$ varies sinusoidally with radial position of the segment $ds'$, current varies substantially sinusoidally about the circumferential direction in the winding means 12 so as to produce a magnetic field similar or identical to that described in connection with FIG. 2.

In other applications of the invention, the winding means 12 can be provided with conductors of other structural forms and physical distributions so long as sinusoidal distribution of magnetizing current is achieved circumferentially about the winding means 12. Thus, the conductor cross section can be uniform circumferentially about the winding means 12 while current density is varied substantially sinusoidally thereabout such as by making individual connections to each of a plurality of uniformly cross sectioned and uniformly but insulatively distributed winding means elements from a suitable source (not shown) having multiple taps electrically disposed along a sinusoidal voltage wave form.

As shown in FIG. 4 in another embodiment of the invention, the flux producing arrangement 10 can also comprise a plurality of ribbon conductors 30 having their flat surfaces along the radial direction and distributed in spaced circumferential relation substantially according to a sine function. Similarly, as shown in FIG. 5, radially disposed ribbon conductors 32 can be uniformly spaced in the circumferential direction but, provided with a radial depth substantially, sinusoidally dependent on conductor circumferential position. In each of these embodiments, sinusoidal circumferential current distribution is substantially obtained. Numerous other arrangements, including the employment of combinations of series, series-parallel and parallel connections in place of or in addition to conductor geometry, can be devised for reaching the needed winding means current distribution.

Since the internal field $B_I$ is substantially uniform, an elongated MHD generating duct (not shown) can be advantageously disposed within the arrangement so that the duct interelectrode direction is transverse to the direction of the field $B_I$. Electric power can thus be generated in the MHD duct in accordance with the principles previously described. For an example of such a duct, reference is made to a copending application entitled Magnetohydrodynamic Generating System filed by W. Brenner and I. Tuba on October 21, 1963, Serial No. 317,671 and assigned to the present assignee.

In other uses, the arrangement 10 can alone or in combination with other structures form the rotor or stator of an electromechanical or dynamoelectric machine. If it is used as a rotor, the stator-rotor air gap field $B_E$ is so distributed about the winding means periphery that a stator coil substantially senses sinusoidal variation of flux linkages as the rotor undergoes uniform rotation. Similarly, if it is used as a stator, a rotor coil of given shape substantially senses sinusoidal variation of flux linkages as the rotor and the air gap field $B_I$ undergo uniform rotation.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A magnetic flux producing arrangement comprising elongated hollow generally cylindrical winding means energizable from a suitable source, said winding means having elongated conductor means, means for supporting said conductor means so that said conductor means extend in the longitudinal direction and are disposed about the circumferential direction, and means for providing a sheet of axially directed current in said conductor means such that the current is substantially sinusoidally distributed about the circumferential direction of said winding means to produce a substantially uniform magnetic flux field within and transaxially of said winding means.

2. A magnetic flux producing arrangement comprising elongated hollow generally cylindrical winding means energizable from a suitable source, said winding means having elongated and substantially uniform ribbon-like conductor winding elements extending longitudinally thereof and distributed about the circumferential direction thereof, said ribbon conductor elements interconnected with a power source to provide a flow of axially directed current in said conductor elements, said ribbon conductor elements further having their flat sides parallel to each other and to a longitudinally directed reference plane so that current through said ribbon conductor elements is distributed substantially sinusoidally about the circumferential direction of said winding means and so that a substantially uniform magnetic flux field is produced within said winding means transversely of the longitudinal direction and said ribbon flat sides.

3. A magnetic flux producing arrangement comprising elongated hollow generally cylindrical winding means energizable from a suitable source, said winding means having elongated conductor means disposed on an elongated hollow substantially nonmagnetic core member, said conductor means extending in the longitudinal direction and disposed about the circumferential direction and means for providing a sheet of axially directed current in said conductor means such that the current is substantially sinusoidally distributed about the circumferential direction of said winding means to produce a substantially uniform magnetic flux field within and transaxially of said winding means.

4. A magnetic flux producing arrangement comprising elongated hollow generally cylindrical winding means energizable from a suitable source, said winding means disposed on an elongated hollow generally cylindrical substantially nonmagnetic core member, said winding means having elongated and substantially uniform ribbon-like conductor winding elements extending longitudinally thereof distributed about the circumferential direction thereof, and separated to form two substantially semi-cylindrical sections, said ribbon conductor elements in each section connected in electrical parallel, said ribbon conductor elements further having their flat sides parallel to each other and to a longitudinally directed reference plane so that current through said ribbon conductor elements is distributed substantially sinusoidally about the circumferential direction of said winding means and so that a substantially uniform magnetic flux field is produced within said winding means transversely of the longitudinal direction and said ribbon flat sides.

5. A magnetic flux producing arrangement comprising elongated hollow generally cylindrical winding means energizable from a suitable source, said winding means having elongated and substantially uniform ribbon-like conductor winding elements extending longitudinally thereof and distributed about the circumferential direction thereof, said ribbon conductor elements interconnected with a power source to provide a flow of axially directed current in said conductor elements, said ribbon conductor elements each further having its flat sides extending in the radial direction, said ribbon conductor elements distributed substantially sinusoidally in the circumferential direction so that current through said ribbon conductor elements is distributed substantially sinusoidally about the circumferential direction of said winding means and so that a substantially uniform magnetic flux field is produced within said winding means transversely of the longitudinal direction.

6. A magnetic flux producing arrangement comprising elongated hollow generally cylindrical winding means energizable from a suitable source, said winding means having elongated and substantially uniform ribbon-like conductor winding elements extending longitudinally thereof and distributed about the circumferential direction thereof, said ribbon conductor elements interconnected with a power source to provide a flow of axially directed current in said conductor elements, said ribbon conductor elements each further having its flat sides extending in the radial direction, said ribbon conductor elements distributed substantially uniformly in the circumferential direction but having their radial depth varying circumferentially substantially as a sine function so that current through said ribbon conductor elements is distributed substantially sinusoidally about the circumferential direction of said winding means and so that a substantially uniform magnetic flux field is produced within said winding means transversely of the longitudinal direction.

No references cited.

LARAMIE E. ASKIN, *Primary Examiner.*

JOHN F. BURNS, *Examiner.*

T. J. KOZMA, *Assistant Examiner.*